United States Patent
Niu et al.

(10) Patent No.: US 11,072,341 B2
(45) Date of Patent: Jul. 27, 2021

(54) VEHICLE CONTROL APPARATUS

(71) Applicant: Honda Motor Co., Ltd., Tokyo (JP)

(72) Inventors: Chao Niu, Wako (JP); Shogo Takano, Wako (JP); Kota Saito, Wako (JP); Takashi Adachi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 182 days.

(21) Appl. No.: 16/448,773

(22) Filed: Jun. 21, 2019

(65) Prior Publication Data

US 2020/0001889 A1 Jan. 2, 2020

(30) Foreign Application Priority Data

Jun. 28, 2018 (JP) .............................. JP2018-122739

(51) Int. Cl.
*B60W 50/08* (2020.01)
*B60W 10/20* (2006.01)
*G05D 1/00* (2006.01)
*B60W 10/04* (2006.01)
*B60W 50/00* (2006.01)
*B60W 50/04* (2006.01)

(52) U.S. Cl.
CPC .......... *B60W 50/082* (2013.01); *B60W 10/04* (2013.01); *B60W 10/20* (2013.01); *G05D 1/0061* (2013.01); *B60W 2050/0005* (2013.01); *B60W 2050/007* (2013.01); *B60W 2050/0078* (2013.01); *B60W 2050/046* (2013.01)

(58) Field of Classification Search
CPC .... B60W 50/082; B60W 10/20; B60W 10/04; B60W 2050/0005; B60W 2050/046; B60W 2050/0078; B60W 2050/007; B60W 30/182; B60W 60/001; B60W 30/02; B60W 50/12; B60W 2520/06; G05D 1/0061
USPC ........................................................... 701/23
See application file for complete search history.

(56) References Cited

U.S. PATENT DOCUMENTS

| | | | | |
|---|---|---|---|---|
| 5,925,082 A | * | 7/1999 | Shimizu | B62D 1/28 701/41 |
| 7,392,120 B2 | * | 6/2008 | Matsumoto | B60T 8/17557 180/168 |
| 2019/0064805 A1 | * | 2/2019 | Frazzoli | G05D 1/0061 |

FOREIGN PATENT DOCUMENTS

JP 2012051441 A 3/2012

* cited by examiner

*Primary Examiner* — Muhammad Shafi
(74) *Attorney, Agent, or Firm* — Duft & Bornsen, PC

(57) ABSTRACT

A vehicle control apparatus including an operation detector detecting driving instruction, a direction detector detecting actual traveling direction of the vehicle, and a microprocessor. The microprocessor is configured to perform: determining whether a deviation of the actual traveling direction from target traveling direction according to the driving instruction is greater than or equal to predetermined deviation; switching to the self-drive mode when the deviation is greater than or equal to the predetermined deviation during traveling in the manual drive mode; and controlling the actuator in accordance with the driving instruction, the controlling including controlling the actuator so as to match the actual traveling direction with the target traveling direction after switching to the self-drive mode, and the switching including switching to the manual drive mode when the actual traveling direction is matched with the target traveling direction after switching to the self-drive mode.

16 Claims, 5 Drawing Sheets

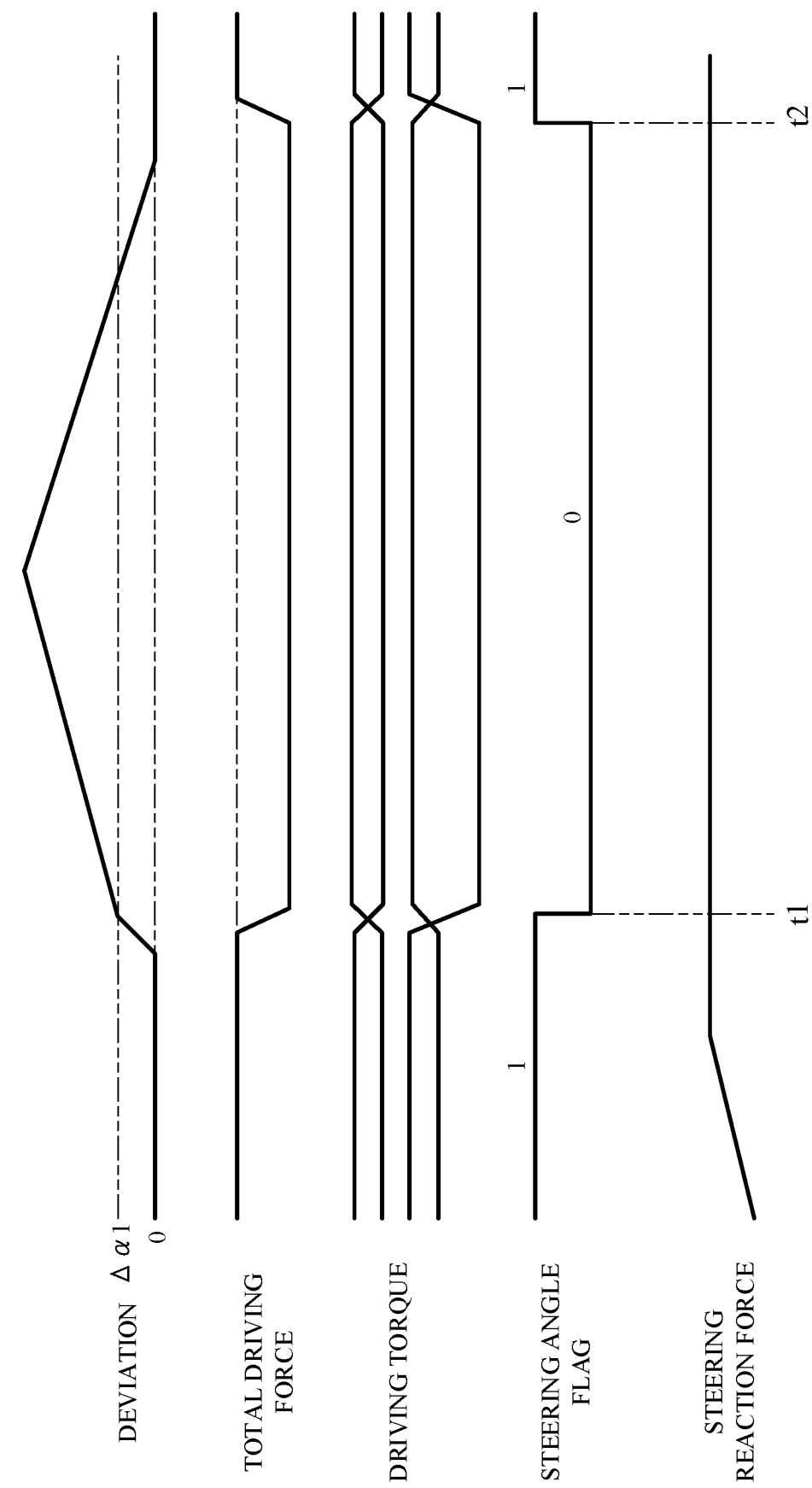

VEHICLE CONTROL APPARATUS

CROSS-REFERENCE TO RELATED APPLICATION

This application is based upon and claims the benefit of priority from Japanese Patent Application No. 2018-122739 filed on Jun. 28, 2018, the content of which is incorporated herein by reference.

BACKGROUND OF THE INVENTION

Field of the Invention

This invention relates to a vehicle control apparatus configured to control a vehicle switchable between manual driving and self-driving.

Description of the Related Art

Conventionally, there is a known apparatus of this type that automatically switches between manual driving and self-driving. Such an apparatus is described in, for example, Japanese Unexamined Patent Publication No. 2012-051441 (JP2012-051441A). The apparatus described in JP2012-051441A, switches from self-driving to manual driving when the driver performs overriding during traveling in self-driving, and thereafter switches from manual driving to self-driving when deviation between actual vehicle path and target self-drive path is less that predetermined value and no override is detected.

JP2012-051441A teaches an apparatus that temporarily switches from self-driving to manual driving in response to an override instruction. On the other hand, JP2012-051441A proposes nothing whatsoever regarding the need for an apparatus that temporarily switches from manual driving to self-driving to thereafter pass driving operations back to the driver without causing an unusual feeling when returning from self-driving to manual driving.

SUMMARY OF THE INVENTION

An aspect of the present invention is a vehicle control apparatus configured to control a vehicle having a drive mode switchable between a self-drive mode enabling a self-drive function and a manual drive mode disabling the self-drive function. The vehicle includes an actuator for traveling. The apparatus includes: an operation detector configured to detect a driving instruction with respect to the actuator in accordance with an operation by a driver; a direction detector configured to detect an actual traveling direction of the vehicle; and an electronic control unit having a microprocessor and a memory. The microprocessor is configured to perform: determining whether a deviation of the actual traveling direction detected by the direction detector from a target traveling direction of the vehicle in accordance with the driving instruction detected by the operation detector is greater than or equal to a predetermined deviation; switching the drive mode to the self-drive mode when it is determined that the deviation is greater than or equal to the predetermined deviation during traveling in the manual drive mode; and controlling the actuator in accordance with the driving instruction detected by the operation detector in the manual drive mode, the controlling including controlling the actuator so as to match the actual traveling direction with the target traveling direction after the drive mode is switched to the self-drive mode, and the switching including switching the drive mode from the self-drive mode to the manual drive mode when the actual traveling direction detected by the direction detector is matched with the target traveling direction after switching the drive mode from the manual drive mode to the self-drive mode.

BRIEF DESCRIPTION OF THE DRAWINGS

The objects, features, and advantages of the present invention will become clearer from the following description of embodiments in relation to the attached drawings, in which:

FIG. 7 is a time chart showing an example of actions performed by the vehicle control apparatus according to the embodiment of the invention.

DETAILED DESCRIPTION OF THE INVENTION

Hereinafter, an embodiment of the present invention is explained with reference to FIGS. 1 to 7. A vehicle control apparatus according to the embodiment of the present invention is applied to a vehicle with a self-driving capability, i.e., self-driving vehicle. First, configurations of the self-driving vehicle (also called "subject vehicle" or merely "vehicle") are explained.

Figure 1:
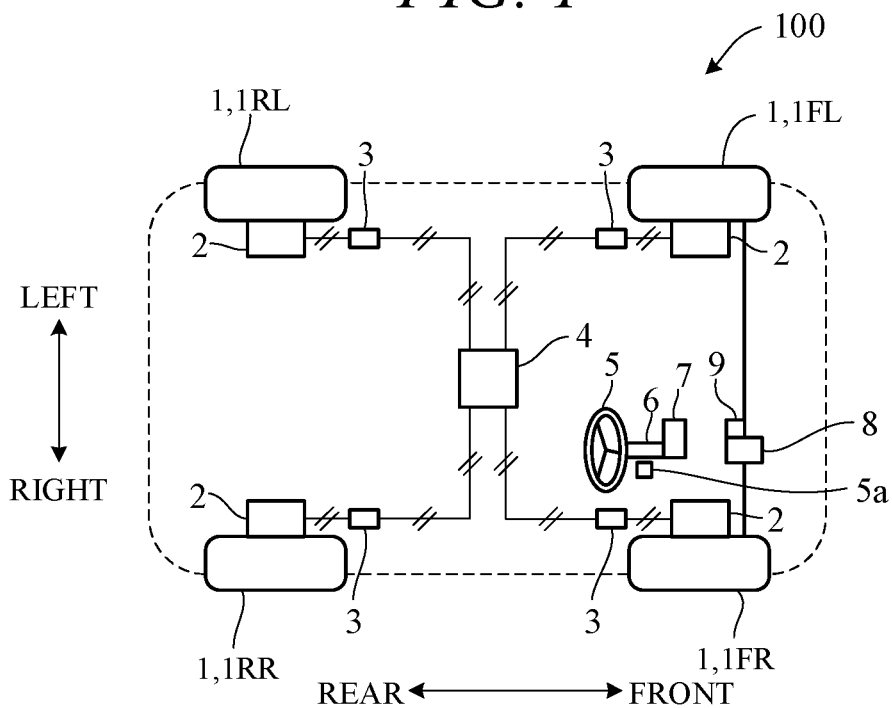
FIG. 1 is a diagram showing a configuration overview of a driving system of a self-driving vehicle incorporating a vehicle control apparatus according to an embodiment of the invention.

FIG. 1 is a diagram showing a configuration overview of a driving system of a vehicle 100 incorporating a control apparatus according to an embodiment of the present invention. The vehicle 100 is not limited to driving in a self-drive mode requiring no driver driving operations but is also capable of driving in a manual drive mode by driver operations. As shown in FIG. 1, the vehicle 100 is a four-wheel-drive vehicle whose four wheels 1 on front left and right, and rear left and right, namely, left and right front wheels 1FL, 1FR, and left and right rear wheels 1RL, 1RR, are all drive wheels. In the following, the four drive wheels 1FL, 1FR, 1RL and 1RR are sometimes called left front wheel, right front wheel, left rear wheel and right rear wheel, respectively.

A motor (electric motor) 2 is connected to each of the drive wheels 1. The motors 2 are connected through inverters 3 to a battery 4 and are driven by power supplied from the battery 4. On the other hand, when the motors 2 are driven by external force, they generate electricity that is stored in the battery 4. Owing to provision of the motors 2 each in association with one of the drive wheels 1 in this manner, the drive wheels 1 can be driven independently of one another. Driving of the motors 2 is controlled by the inverter 3 under control of a controller (FIG. 2).

A steering wheel 5 to be rotationally operated by a driver is installed at a driver's seat. One end portion of a steering shaft 6 is connected to the steering wheel 5 to rotate integrally with the steering wheel 5. An amount of operation of the steering wheel 5 (steering angle) is detected by a steering sensor 5a. A steering actuator 7 is attached to the steering shaft 6. The steering actuator 7 is configured as an electric motor, for example. The steering actuator 7 drives to apply reaction force in response to driver steering wheel operation. Reaction force applied by the steering actuator 7 in response to driver steering wheel operation is greater in proportion as amount of operation of the steering wheel 5 is greater.

A steering gear box 8 of rack-and-pinion type, for example, is installed between the front left and right drive wheels 1FL and 1FR. A turning actuator 9 is attached to the steering gear box 8. The turning actuator 9 is, for example, an electric motor. In manual drive mode, the turning actuator 9 is driven in accordance with steering angle detected by the steering sensor 5a. The rack of the steering gear box 8 is driven to move left and right by the turning actuator 9 and thereby turn the front drive wheels 1FL and 1FR left and right in accordance with driver steering operations. In self-drive mode, on the other hand, the turning actuator 9 is driven to turn the drive wheels 1Fl and 1FR in target traveling direction of the vehicle disregarding driver steering operations.

Figure 2:
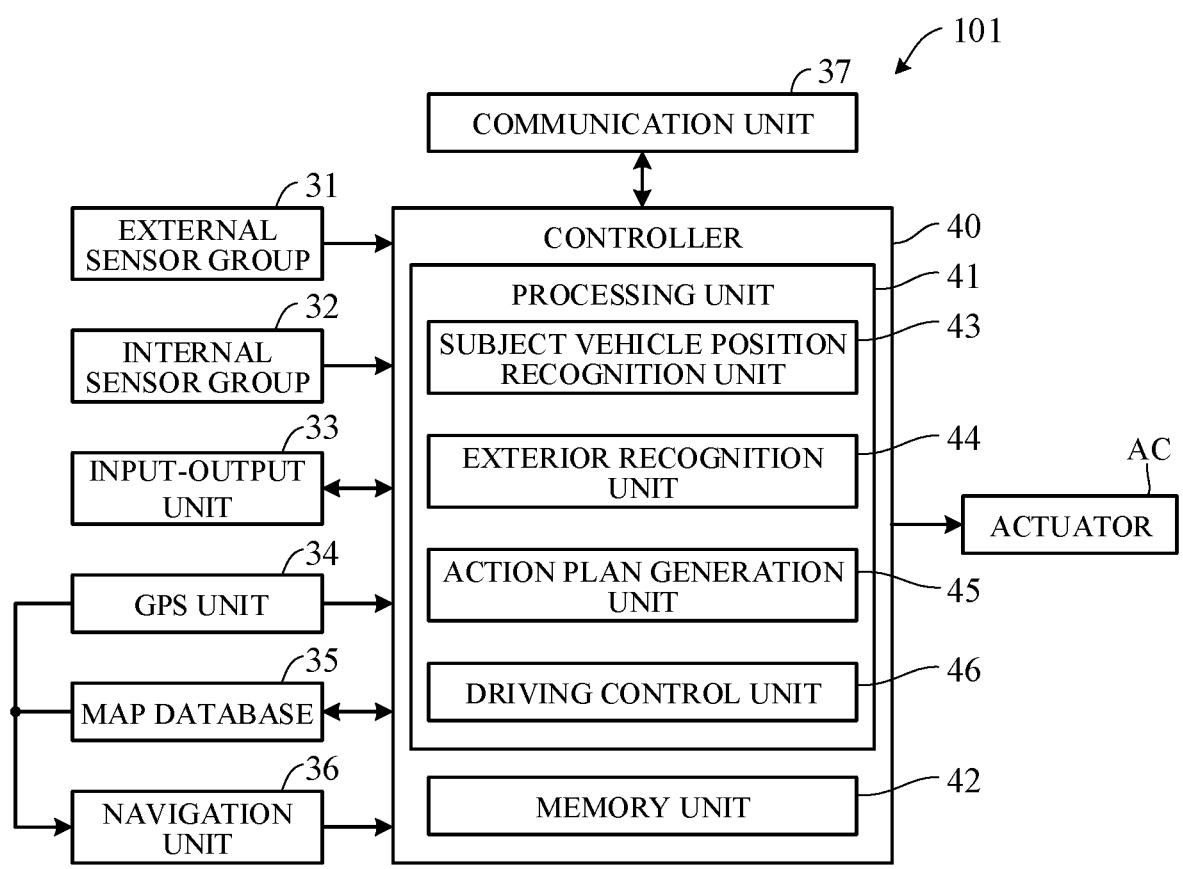
FIG. 2 is a block diagram schematically illustrating overall configuration of a vehicle control system controlling the self-driving vehicle of FIG. 1.

FIG. 2 is a block diagram schematically illustrating overall configuration of a vehicle control system 101 according to the present embodiment. As shown in FIG. 2, the vehicle control system 101 includes mainly the controller 40, and as members communicably connected with the controller 40 through CAN (Controller Area Network) communication or the like, an external sensor group 31, an internal sensor group 32, an input-output unit 33, a GPS unit 34, a map database 35, a navigation unit 36, a communication unit 37, and actuators AC for traveling.

The term external sensor group 31 herein is a collective designation encompassing multiple sensors (external sensors) for detecting external circumstances constituting vehicle ambience data. For example, the external sensor group 31 includes, inter alia, a LIDAR (Light Detection and Ranging) for measuring distance from the vehicle 100 to ambient obstacles by measuring scattered light produced by laser light radiated from the vehicle 100 in every direction, a RADAR (Radio Detection and Ranging) for detecting other vehicles and obstacles around the vehicle 100 by radiating electromagnetic waves and detecting reflected waves, and cameras having a CCD, CMOS or other image sensor and attached to the vehicle 100 for imaging ambience (forward, reward and sideways) of the vehicle 100.

The term internal sensor group 32 herein is a collective designation encompassing multiple sensors (internal sensors) for detecting driving state of the vehicle 100. For example, the internal sensor group 32 includes, inter alia, a vehicle speed sensor for detecting vehicle speed of the vehicle 100 and acceleration sensors for detecting forward-rearward direction acceleration and lateral acceleration of the vehicle 100, respectively, and a yaw rate sensor for detecting rotation angle speed (yaw rate) around a vertical axis through center of gravity of the vehicle 100. The internal sensor group 32 also includes sensors (e.g., steering sensor 5a) for detecting driver driving operations in manual drive mode, including, for example, accelerator pedal operations, brake pedal operations, steering wheel 5 operations and the like.

The term input-output unit 33 is used herein as a collective designation encompassing apparatuses receiving instructions input by the driver and outputting information to the driver. The input-output unit 33 includes, inter alia, switches which the driver uses to input various instructions, a microphone which the driver uses to input voice instructions, a display for presenting information to the driver via displayed images, and a speaker for presenting information to the driver by voice. The switch of the input-output unit 33 includes a self/manual drive select switch for instructing a self-drive mode or manual drive mode.

The self/manual drive select switch, for example, is configured as a switch manually operable by the driver to output an instruction of switching to a self-drive mode enabling self-drive functions or a manual drive mode disabling self-drive functions in accordance with operation of the switch. Optionally, the self/manual drive select switch can be configured to instruct switching from manual drive mode to self-drive mode or from self-drive mode to manual drive mode without operating the self/manual drive select switch. For example, when a predetermined operation is made by a driver or a predetermined condition is satisfied, drive mode can be switched automatically to self-drive mode or manual drive mode.

The GPS unit 34 includes a GPS receiver (GPS sensor) for receiving position determination signals from multiple GPS satellites, and measures absolute position (latitude, longitude and the like) of the vehicle 100 based on the signals received from the GPS receiver.

The map database 35 is a unit storing general map data used by the navigation unit 36 and is, for example, implemented using a hard disk. The map data include road position data and road shape (curvature etc.) data, along with intersection and road branch position data. The map data stored in the map database 35 are different from high-accuracy map data stored in a memory unit 42 of the controller 40.

The navigation unit 36 retrieves target road routes to destinations input by the driver and performs guidance along selected target routes. Destination input and target route guidance is performed through the input-output unit 33. Destination can be automatically set not through the input-output unit 33. Target routes are computed based on current position of the vehicle 100 measured by the GPS unit 34 and map data stored in the map database 35.

The communication unit 37 communicates through networks including the Internet and other wireless communication networks to access servers (not shown in the drawings) to acquire map data, traffic data and the like, periodically or at arbitrary times. Acquired map data are output to the map database 35 and/or memory unit 42 to update their stored map data. Acquired traffic data include congestion data and traffic light data including, for instance, time to change from red light to green light.

The actuators AC are actuators for operating various devices in relation to vehicle traveling, i.e., for traveling of the vehicle 100. The actuators AC include four motors 2 for driving the four drive wheels 1, respectively, a brake actuator for operating a braking device, and the turning actuator 9 for turning the front wheels 1FL and 1FR. Although the motors 2 are controlled by the inverters 3, as shown in FIG. 1, illustrations of the inverters 3 are omitted in FIG. 2.

The controller 40 is constituted by an electronic control unit (ECU). In FIG. 2, the controller 40 is integrally configured by consolidating multiple function-differentiated ECUs such as a motor control ECU, a turning control ECU and so on. Optionally, these ECUs can be individually provided. The controller 40 incorporates a computer including a CPU or other processing unit (a microprocessor) 41 for executing a processing in relation to travel control, the memory unit (a memory) 42 of RAM, ROM, hard disk and the like, and an input-output interface or other peripheral circuits not shown in the drawings.

The memory unit 42 stores high-accuracy detailed map data including, inter alia, lane center position data and lane boundary line data. More specifically, road data, traffic regulation data, address data, facility data, telephone number data and the like are stored as map data. The road data include data identifying roads by type such as expressway, toll road and national highway, and data on, inter alia, number of road lanes, individual lane width, road gradient, road 3D coordinate position, lane curvature, lane merge and branch point positions, and road signs. The traffic regulation data include, inter alia, data on lanes subject to traffic restriction or closure owing to construction work and the like. The memory unit 42 also stores various programs for performing processing, and threshold values used in the programs, etc.

As functional configurations in relation to mainly self-driving, the processing unit 41 includes a subject vehicle position recognition unit 43, an exterior recognition unit 44, an action plan generation unit 45, and a driving control unit 46.

The subject vehicle position recognition unit 43 recognizes map position of the vehicle 100 (subject vehicle position) based on subject vehicle position data calculated by the GPS unit 34 and map data stored in the map database 35. Optionally, the subject vehicle position can be recognized using map data (building shape data and the like) stored in the memory unit 42 and ambience data of the vehicle 100 detected by the external sensor group 31, whereby the subject vehicle position can be recognized with high accuracy. Optionally, when the subject vehicle position can be measured by sensors installed externally on the road or by the roadside, the subject vehicle position can be recognized with high accuracy by communicating with such sensors through the communication unit 37.

The exterior recognition unit 44 recognizes external circumstances around the vehicle 100 based on signals from cameras, LIDERs, RADARs and the like of the external sensor group 31. For example, it recognizes position, speed and acceleration of nearby vehicles (forward vehicle or rearward vehicle) driving in the vicinity of the vehicle 100, position of vehicles stopped or parked in the vicinity of the vehicle 100, and position and state of other objects. Other objects include traffic signs, traffic lights, road boundary and stop lines, buildings, guardrails, power poles, commercial signs, pedestrians, bicycles, and the like. Recognized states of other objects include, for example, traffic light color (red, green or yellow) and moving speed and direction of pedestrians and bicycles.

The action plan generation unit 45 generates a driving path (target path) of the vehicle 100 from present time point to a certain time ahead based on, for example, a target route computed by the navigation unit 36, subject vehicle position recognized by the subject vehicle position recognition unit 43, and external circumstances recognized by the exterior recognition unit 44. When multiple paths are available on the target route as target path candidates, the action plan generation unit 45 selects from among them the path that optimally satisfies legal compliance, safe efficient driving and other criteria, and defines the selected path as the target path. The action plan generation unit 45 then generates an action plan matched to the generated target path. An action plan is also called "travel plan".

The action plan includes action plan data set for every unit time Δt (e.g., 0.1 sec) between present time point and a predetermined time period T (e.g., 5 sec) ahead, i.e., includes action plan data set in association with every unit time Δt interval. The action plan data include position data of the vehicle 100 and vehicle state data for every unit time Δt. The position data are, for example, target point data indicating 2D coordinate position on road, and the vehicle state data are vehicle speed data indicating vehicle speed, direction data indicating direction of the vehicle 100, and the like. Action plan is updated every unit time Δt.

The action plan generation unit 45 generates the target path by connecting position data at every unit time Δt between present time point and predetermined time period T ahead in time order. Further, the action plan generation unit 45 calculates acceleration (target acceleration) of sequential unit times Δt, based on vehicle speed (target vehicle speed) corresponding to target point data of sequential unit times Δt on target path. In other words, the action plan generation unit 45 calculates target vehicle speed and target acceleration. Optionally, the driving control unit 46 can calculate target acceleration.

The driving control unit 46 controls the actuators AC in accordance with drive mode (self-drive mode, manual drive mode). For example, in self-drive mode, the driving control unit 46 controls the actuators AC to drive the vehicle 100 along a target path generated by the action plan generation unit 45. More specifically, in self-drive mode, the driving control unit 46 calculates required driving force for achieving the target accelerations at each unit time included in the action plan generated by the action plan generation unit 45, taking running resistance caused by road gradient and the like into account. And the actuators AC are feedback controlled to bring actual acceleration detected by the internal sensor group 32, for example, into coincidence with target acceleration. In other words, it controls the actuators AC so that the vehicle 100 travels at target vehicle speed and target acceleration. On the other hand, in manual drive mode, the driving control unit 46 controls the actuators AC in accordance with driving instructions by the driver (accelerator opening angle, steering angle of the steering wheel 5, and the like) acquired from the internal sensor group 32.

Figure 3:
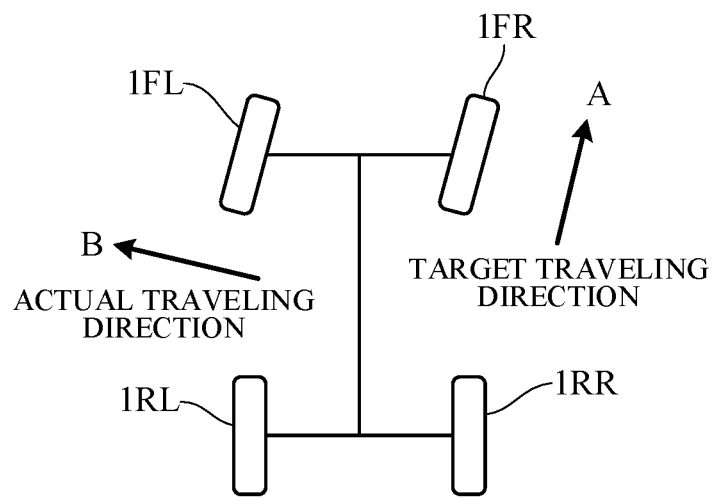
FIG. 3 is a diagram showing an example of an action during traveling of the vehicle.

FIG. 3 is a diagram schematically illustrating an example of traveling behavior of the vehicle 100 when traveling in manual drive mode on road surface of low friction coefficient (low μ road) such as a snow-covered road or icy road. As shown in FIG. 3, when any of drive wheels 1FL, 1FR, 1RL and 1RR slip (spin) during traveling on a low μ road in manual drive mode, a difference is apt to arise between traveling direction of the vehicle 100 intended by the driver (target traveling direction A), i.e., turned direction of the drive wheels 1FL and 1FR, and actual traveling direction of the vehicle 100 (actual traveling direction B).

In order to optimally resolve this difference irrespective of driver driving skill, manual drive mode should preferably be temporarily switched to self-drive mode so as to control traveling behavior of the vehicle 100 using the controller 40 while disregarding driver driving operations. Moreover, when returning from self-drive mode to manual drive mode after temporarily controlling traveling behavior in self-drive mode, driving operations should preferably be passed back to the driver without giving the driver an unusual feeling. The vehicle control apparatus according to the present embodiment is therefore configured as set out in the following so that when returning to manual driving after once temporarily switching from manual driving to self-driving, driving operations are passed back to the driver without causing the driver any unusual feeling.

Figure 4:
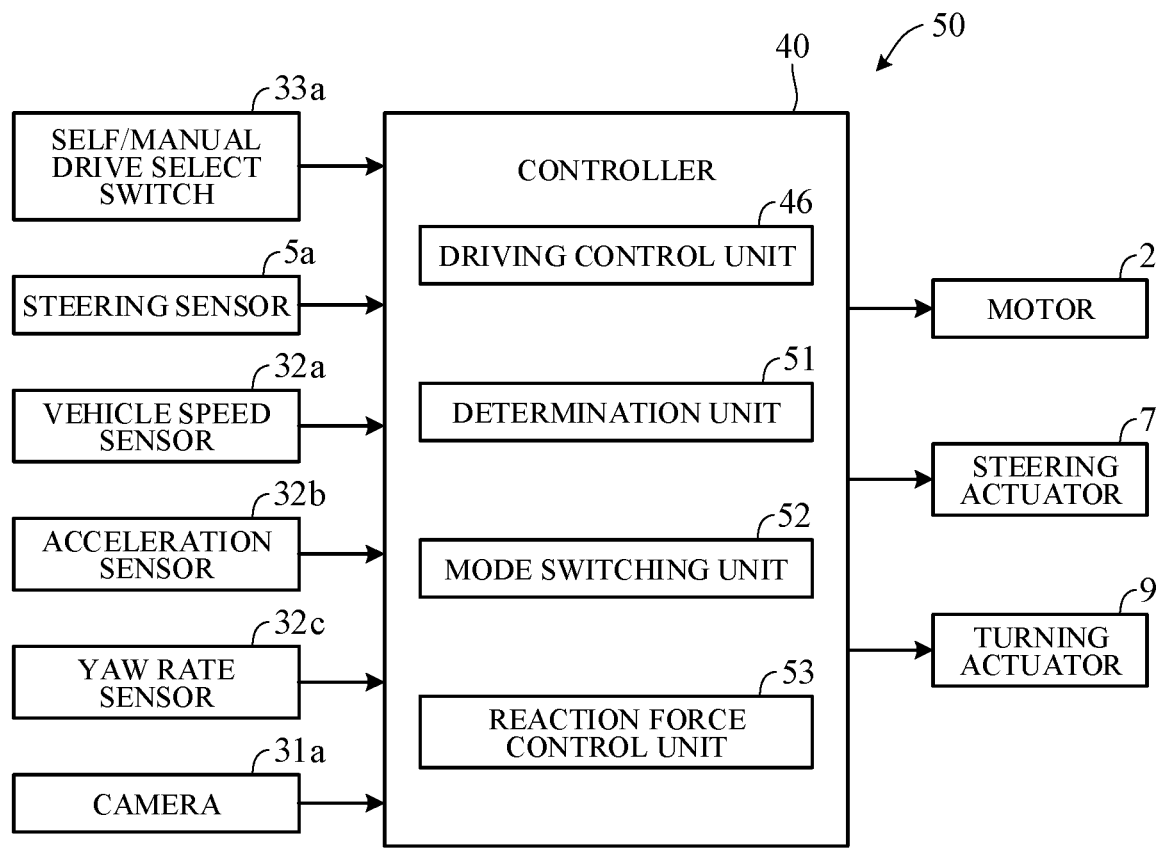
FIG. 4 is a block diagram illustrating main configuration of the vehicle control apparatus according to the embodiment of the invention.

FIG. 4 is a block diagram showing main components of a vehicle control apparatus 50 according to an embodiment of the present embodiment. This vehicle control apparatus 50 is adapted to control traveling actions of the vehicle 100 and forms part of the vehicle control system 101 of FIG. 2.

As shown in FIG. 4, the vehicle control apparatus 50 includes the controller 40, and connected to the controller 40, a self/manual drive select switch 33a, a steering sensor 5a, a vehicle speed sensor 32a, an acceleration sensor 32b, a yaw rate sensor 32c, a camera 31a, four motors 2 (only one shown), a steering actuator 7 and a turning actuator 9. Although the motors 2 are controlled by the inverter 3, illustration of the inverter 3 is omitted in FIG. 4.

The self/manual drive select switch 33a is a mode selection switch switched in accordance with an operation by the drive to select one of manual drive mode and self-drive mode, and forms part of the input-output unit 33 of FIG. 2. The steering sensor 5a, vehicle speed sensor 32a, acceleration sensor 32b and yaw rate sensor 32c form part of the internal sensor group 32 of FIG. 2. The camera 31a captures images around the vehicle 100 and forms part of the external sensor group 31 of FIG. 2. The actual traveling direction of the vehicle 100 can be detected based on signal from the camera 31a. In other words, the camera 31a can function as a detector for detecting traveling direction of the vehicle 100.

As main functional configurations, the controller 40 includes the driving control unit 46, a determination unit 51, a mode switching unit 52 and a reaction force control unit 53.

While the vehicle 100 is travel in manual drive mode in response to selection by the self/manual drive select switch 33a, the determination unit 51 determines based on signals from the steering sensor 5a, vehicle speed sensor 32a, acceleration sensor 32b and yaw rate sensor 32c whether behavior of the vehicle 100 abruptly has changed contrary to driver operation. Specifically, degrees of divergence of measured values of vehicle 100 behavior from values instructed by driver driving operations are determined and whether the degrees of divergence are equal to or greater than predetermined values is determined. This determination amounts to determining whether control of the vehicle 100 in response to driver driving operations has been incapacitated owing to, for example, slipping of the vehicle 100 during traveling on a low μ road.

In addition, the determination unit 51 determines whether deviation (angle) $\Delta\alpha$ between a target traveling direction of the vehicle 100 detected by the steering sensor 5a and an actual traveling direction of the vehicle 100 detected by the camera 31a is equal to or greater than predetermined value $\Delta\alpha1$. This is for determining whether deviation $\Delta\alpha$ needs to be decreased by switching to self-driving, and predetermined value $\Delta\alpha1$ is set to a value (e.g., around 15° to 30° beyond which correction of deviation by manual driving would be difficult.

Figure 5A:
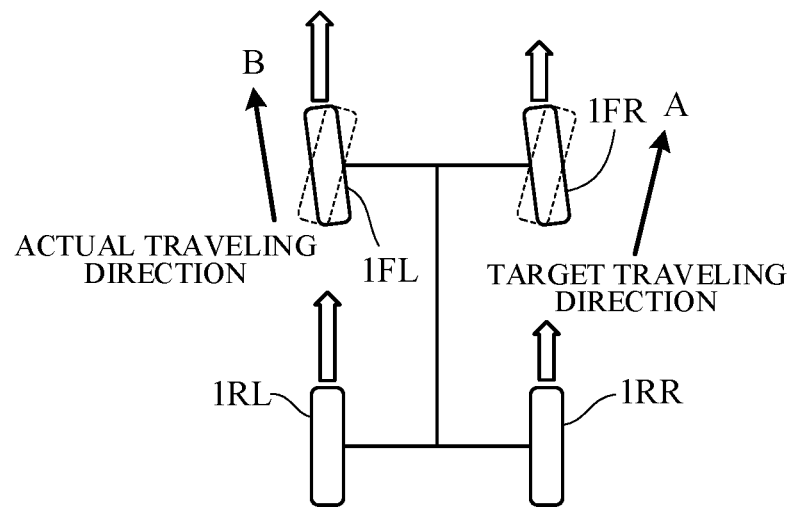
FIG. 5A is a diagram showing an example of a behavior change of the vehicle in the vehicle control apparatus according to the embodiment of the invention.
Figure 5B:
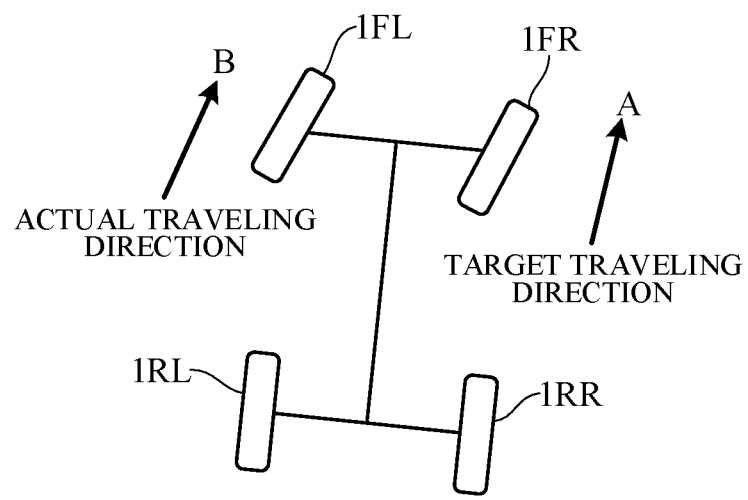
FIG. 5B is a diagram showing an example of an action following the action of FIG. 5A.

When the determination unit 51 determines during traveling in manual drive mode that control of the vehicle 100 is incapacitated and that deviation $\Delta\alpha$ equals or exceeds predetermined value $\Delta\alpha1$, the mode switching unit 52 automatically switches drive mode to self-drive mode. After drive mode is switched to self-drive mode, the driving control unit 46 controls behavior of the vehicle 100 to bring actual traveling direction into coincidence with target traveling direction. FIGS. 5A and 5B are diagrams showing an example of behavior change of the vehicle 100. More specifically, they are diagrams showing an example in which loss of control capability of the vehicle 100 results in its actually advancing in a direction B (e.g., leftward) different from target traveling direction A (e.g., rightward) notwithstanding that the front wheels 1FL and 1FR are turned in target traveling direction A. The driving control unit 46, as one example of processing, first outputs a control signal to the turning actuator 9 to reduce turning angle (tire steering angle), as indicated, from broken line tires to solid line tires in FIG. 5A. In other words, when the vehicle 100 is in control incapacitated condition, traveling direction of the vehicle 100 is hard to change to target direction with the drive wheels 1FL and 1FR in turned condition, so turning angle is first reduced to align direction of the drive wheels 1FL and 1FR with actual traveling direction B.

Next, the driving control unit 46 outputs control signals to the motors 2 to control driving torques of the drive wheels 1 so as to direct the vehicle 100 in target traveling direction A. In other words, as indicated by arrows in FIG. 5A, distribution of driving torque to the drive wheels 1 is altered to large on the left drive wheels 1FL and 1RL side and small on the right drive wheels 1FR and 1RR side. As a result, actual traveling direction B approaches target traveling direction A. In this case, as target traveling direction is adopted, for example, the same (unmodified) target traveling direction A as instructed in manual drive mode immediately before the switch to self-drive mode. The driving control unit 46 additionally outputs a control signal also to the turning actuator 9 to turn the drive wheels 1FL and 1FR toward the target traveling direction A, as shown in FIG. 5B. As a result, actual traveling direction B comes to coincide with target traveling direction A. So long as drive mode remains switched to self-drive mode, steering operation by the driver is ignored and the drive wheels 1FL and 1FR are turned with no consideration to driver steering operation.

It may happen after drive mode has been switched to self-drive mode by the mode switching unit 52 that the driver wants to change target traveling direction A because of change in road condition. To contend with such a situation, it is optionally possible based on current position of the vehicle 100 detected by the GPS unit 34 and map data stored in the memory unit 42, or on information acquired by the camera 31a regarding vehicle surroundings, or on similar information, to estimate a target path of the vehicle 100, i.e., a target traveling direction A preferred by the driver, and to use the estimated target direction as target traveling direction A during traveling in self-drive mode. Another option is to use the steering sensor 5a to detect operation of the steering wheel 5 during traveling in self-drive mode and to use a direction corresponding to the detected value as the target traveling direction A.

Once actual traveling direction of the vehicle 100 is matched with target traveling direction by traveling in self-drive mode, the mode switching unit 52 automatically switches drive mode back to manual drive mode. The driving control unit 46 thereafter controls the motors 2 and the turning actuator 9 in accordance with driving operations by the driver. Optionally, the driver can be informed of whether drive mode has been automatically switched by displaying notification on a display or the like installed on an instrument panel.

The reaction force control unit 53 outputs a control signal to the steering actuator 7 to apply reaction force against driver steering operation. The reaction force control unit 53 applies reaction force not only during traveling in manual drive mode but also equally during traveling in self-drive mode. In other words, reaction force is applied to make rotation angle of the steering wheel 5 (steering angle) an angle corresponding to turning angle also when steering operation is in disabled condition.

Figure 6:
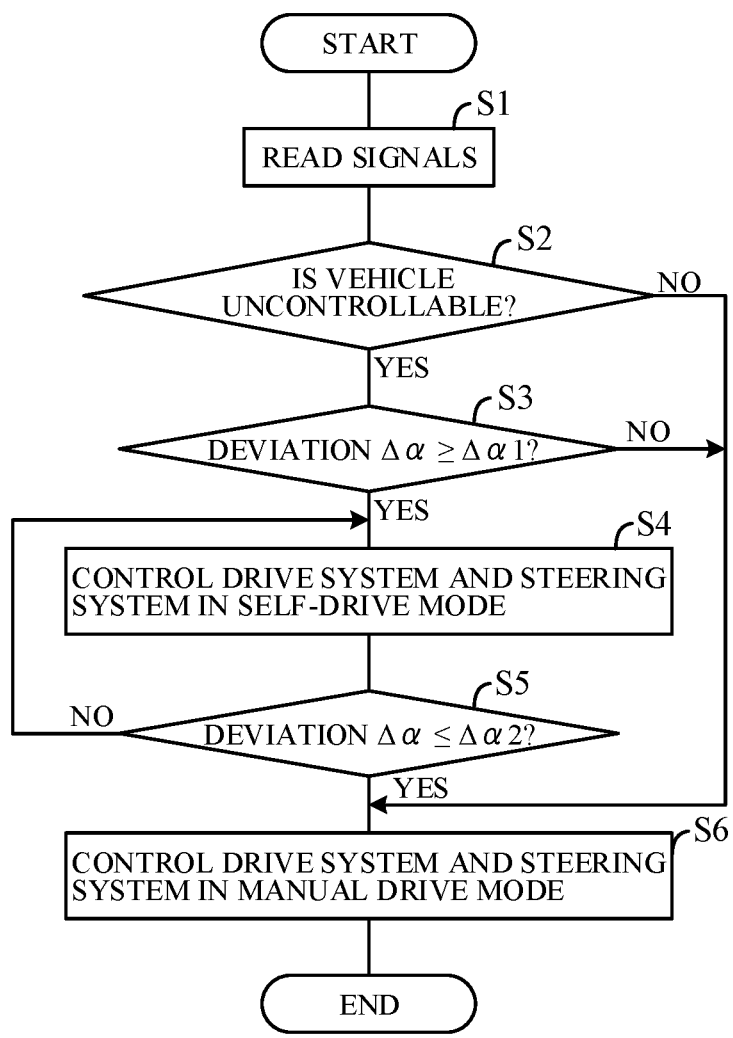
FIG. 6 is a flowchart showing an example of processing performed by a controller of FIG. 4.

FIG. 6 is a flowchart showing an example of processing performed by the CPU of the controller 40 of FIG. 4 in accordance with a program stored in the memory unit 42 in advance. The processing shown in this flowchart is, for example, started when manual drive mode is selected by the self/manual drive select switch 33a and periodically repeated.

First, in S1 (S: processing Step), signals are read from, inter alia, the sensors 5a, 32a, 32b and 32c, and the camera 31a. Next, in S2, whether the vehicle 100 has fallen into a condition incapable of control by driving operations of the driver is determined based on signals from the vehicle speed sensor 32a, acceleration sensor 32b and yaw rate sensor 32c. If a positive decision is made in S2, the routine proceeds to S3, and if a negative decision is made, it skips S3 to S5 and proceeds to S6.

In S3, whether deviation $\Delta\alpha$ between actual traveling direction and target traveling direction of the vehicle 100 is equal to or greater than predetermined value $\Delta\alpha 1$ is determined based on signals acquired from the steering sensor 5a and camera 31a. If a positive decision is made in S3, the routine proceeds to S4, and if a negative decision is made, it skips S4 and S5 and proceeds to S6. In S4, drive mode is switched to self-drive mode and the drive system (motors 2) and steering system (turning actuator 9) are controlled in self-drive mode. For example, control signals are output to the motors 2 to regulate driving force distribution of the motors 2 so as to control actual traveling direction of the vehicle 100 to target traveling direction instructed in manual drive mode immediately before mode switching, and a control signal is output to the turning actuator 9 to regulate turning angle.

Next, in S5, whether deviation $\Delta\alpha$ between actual traveling direction and target traveling direction of the vehicle 100 is equal to or less than predetermined value $\Delta\alpha 2$ is determined. Predetermined value $\Delta\alpha 2$ is defined as a value less than predetermined value $\Delta\alpha 1$. If a positive decision is made in S5, the routine proceeds to S6, and if a negative decision is made, it returns to S4. In S6, drive mode is switched to manual drive mode and the drive system and steering system are controlled in manual drive mode. In other words, the motors 2 and the turning actuator 9 are driven in accordance with driver driving operations.

Although not indicated in the drawings, during traveling in manual drive mode, a control signal is output to the steering actuator 7 to apply reaction force against steering operation. Also after drive mode is switched to self-drive mode, a control signal is similarly output to the steering actuator 7 to apply reaction force against steering operation.

FIG. 7 is a time chart showing an example of actions performed by the vehicle control apparatus 50 according to the present embodiment. FIG. 7 shows examples of time-course changes in deviation $\Delta\alpha$ between actual traveling direction and target traveling direction of the vehicle 100, travel driving force of the whole vehicle (total driving force), driving torques of the drive wheels 1, steering angle flag, and steering reaction force. The steering angle flag is set to 1 when driver steering operation is enabled, i.e., when the drive wheels 1FL and 1FR are turned in accordance with steering operation, and set to 0 when steering operation is disabled.

As shown in FIG. 7, when at time t1 during traveling in manual drive mode, deviation $\Delta\alpha$ between actual traveling direction and target traveling direction becomes predetermined value $\Delta\alpha 1$ or greater, drive mode switches from manual drive mode to self-drive mode (S4). Therefore, driver steering operation is disabled and driving torques of the motors 2 are controlled to match actual traveling direction with target traveling direction. Although in the particular example of FIG. 7, total driving force is low at this time, driving torques of the motors 2 can optionally be controlled to prevent total driving decline. Since the steering actuator 7 is driven to apply steering reaction force in self-drive mode, operational feeling of the steering wheel 5 experienced by the driver is the same as that when in manual drive mode.

Then when deviation $\Delta\alpha$ between actual traveling direction and target traveling direction becomes predetermined value $\Delta\alpha 2$ (e.g., 0) or less at time t2, drive mode returns to manual drive mode (S6). As a result, driver steering operation is enabled, and the drive wheels 1FL and 1FR are thereafter turned in accordance with steering operation. Predetermined value $\Delta\alpha 2$ can be a value greater than 0 insofar as it is smaller than predetermined value $\Delta\alpha 1$. Target traveling direction is, for example, defined as traveling direction corresponding to driver steering operation immediately before switching to self-drive mode. Since switching to self-drive mode is performed automatically by the mode switching unit 52, the driver is very likely to continue steering operation even after traveling in self-drive mode starts. This means that return to manual drive mode can be optimally performed without giving the driver an unusual feeling when driving operations are passed back to the driver, by timing the return to manual drive mode to occur when actual traveling direction in self-drive mode comes to coincide with target traveling direction corresponding to steering operation immediately before traveling in self-drive mode is started.

In this case, the driver can continue to operate the steering wheel with no unusual feeling because steering reaction force is applied also when steering operation is in disabled condition in self-drive mode. Therefore, since steering reaction force does not change when self-drive mode returns to manual drive mode, the driver is saved from sensing an unusual feeling.

The present embodiment can achieve advantages and effects such as the following:

(1) The vehicle control apparatus 50 controls the vehicle 100 capable of switching drive mode to self-drive mode in which self-driving capability is enabled and manual drive mode in which self-driving capability is disabled. This vehicle control apparatus 50 includes: the internal sensor group 32 (including, inter alia, the steering sensor 5a) for detecting driving instructions with respect to actuators AC (including, inter alia, the motors 2 and the turning actuator 9) input by driver operation; the camera 31a for detecting actual traveling direction of the vehicle 100; the determination unit 51 for determining whether deviation $\Delta\alpha$ between target traveling direction of the vehicle 100, according to driving instructions, detected by the steering sensor 5a and actual traveling direction of the vehicle 100 detected by the camera 31a is equal to or greater than predetermined value $\Delta\alpha 1$; the mode switching unit 52 for switching drive mode to self-drive mode when during traveling in manual drive mode the determination unit 51 determines that deviation $\Delta\alpha$ is equal to or greater than predetermined value $\Delta\alpha 1$; and the driving control unit 46 for in manual drive mode controlling actuators AC in accordance with driving instructions detected by the internal sensor group 32 (FIGS. 2 and 4). The driving control unit 46 is responsive to drive mode being switched to self-drive mode by the mode switching unit 52, for controlling actuators AC (motors 2 and turning actuator 9) to match actual traveling direction of the vehicle 100 with target traveling direction. When actual traveling direction of the vehicle 100 comes into coincidence with target traveling direction after switching of drive mode to self-drive mode, the mode switching unit 52 switches drive mode from self-drive mode to manual drive mode.

Since the mode switching unit 52 switches to self-drive mode automatically, there is a high probability of the driver continuing to perform steering operation even after the switch to self-drive mode. So by carrying out switching back to manual drive mode at time when direction of advance of the vehicle 100 comes into coincidence with target traveling direction during traveling in self-drive mode, driving operations can be returned to the driver free of unnatural feeling.

(2) When the mode switching unit 52 switches to self-drive mode, the driving control unit 46 controls actuators AC so as to bring actual traveling direction into coincidence with target traveling direction (according to driving instructions) detected by the steering sensor 5a immediately before drive mode has been switched to self-drive mode. Since drive mode is switched to self-drive mode only temporarily, the driver is highly likely to continue operation as immediately before the switch to self-drive mode. Therefore, defining target traveling direction as direction according to steering operation immediately before switching to self-drive mode enables optimum transition of driving operations.

(3) The vehicle control apparatus 50 further includes the steering actuator 7 for applying reaction force against driver operation of the steering wheel 5 (FIG. 4). When the mode switching unit 52 switches drive mode from manual drive mode to self-drive mode, the steering actuator 7 maintains the reaction force applied immediately before the switch to self-drive mode. Since this ensures the driver the same operational feeling as in manual drive mode even after the switch to self-drive mode, transition of driving operations can be achieved without the driver being aware of the switch to self-drive mode.

(4) The vehicle control apparatus 50 further includes the self/manual drive select switch 33a for selective operation by the driver to choose either self-drive mode or manual drive mode (FIG. 4). On condition of manual drive mode being selected by the self/manual drive select switch 33a, the mode switching unit 52 switches drive mode to self-drive mode when the determination unit 51 determines that deviation $\Delta\alpha$ is equal to or greater than predetermined value $\Delta\alpha 1$. Although driver selection of manual drive mode can be considered to indicate strong driver preference for manual drive mode, the switch to self-drive mode is brief and minimally interposed, so that the driving operations demanded by the driver can be expeditiously satisfied notwithstanding the drive mode switching.

Various modifications of the present embodiment are possible. Some examples are explained in the following. Although in the above embodiment, steering operation by the driver, i.e., driving instruction with respect to the turning actuator 9 as an example of an actuator for traveling is detected by the steering sensor 5a, this may be detected by a sensor or the like for detecting steering reaction force. Therefore, an operation detector is not limited to the above configuration. Although in the above embodiment, actual traveling direction of the vehicle 100 is detected by the camera 31a, a direction detector is not limited to this. In the above embodiment, the determination unit 51 determines whether the vehicle 100 is uncontrollable and whether the deviation $\Delta\alpha$ between target traveling direction and actual traveling direction of the vehicle 100 is greater than or equal to a predetermined value (predetermined deviation) $\Delta\alpha 1$. However, as long as being configured to determine whether a deviation of the actual traveling direction detected by the direction detector from a target traveling direction of the vehicle in accordance with the driving instruction detected by the operation detector is greater than or equal to a predetermined deviation, a determination unit is not limited to the above configuration.

In the above embodiment, when the mode switching unit 52 switches to self-drive mode, turning angle is temporarily decreased, and thereafter the driving control unit 46 controls the motors 2 (a second actuator) and the turning actuator (a first actuator) so as to match actual traveling direction of the vehicle 100 with target traveling direction (FIGS. 5A and 5B). However, as long as in a state of being switched to self-drive mode, controlling the actuator for traveling so as to match actual traveling direction of the vehicle with target traveling direction, a driving control unit is not limited to the above configuration. Although in the above embodiment, the steering actuator 7 applies reaction force to operation of the steering wheel 5, a reaction force generation part is not limited to the above configuration. In the above embodiment, under the condition that manual drive mode is selected by the self/manual drive select switch 33a serving as a mode selection portion, the mode switching unit 52 switches from manual drive mode to self-drive mode and thereafter from self-drive mode to manual drive mode. However, drive mode may be switched in the same manner as the above configuration without such a selection by the mode selection portion.

In the above embodiment, the vehicle control apparatus 50 is applied to the vehicle 100 including the four motors 2 connected to the four drive wheels 1. However, a vehicle control apparatus according to the invention can be applied not only to the above vehicle 100, but also to various vehicles configured to switchable drive mode between self-drive mode and manual drive mode.

The present invention can also be used as a vehicle control method controlling a vehicle switchable a drive mode between a self-drive mode enabling a self-drive function and a manual drive mode disabling the self-drive function.

The above embodiment can be combined as desired with one or more of the above modifications. The modifications can also be combined with one another.

According to the present invention, when drive mode is returned to manual drive mode after being temporarily switched from manual drive mode to self-drive mode, driving operations can be returned to the driver free of unnatural feeling.

Above, while the present invention has been described with reference to the preferred embodiments thereof, it will be understood, by those skilled in the art, that various changes and modifications may be made thereto without departing from the scope of the appended claims.

What is claimed is:

1. A vehicle control apparatus configured to control a vehicle having a drive mode switchable between a self-drive mode enabling a self-drive function and a manual drive mode disabling the self-drive function, the vehicle including an actuator for traveling, the apparatus comprising:
  an operation detector configured to detect a driving instruction with respect to the actuator in accordance with an operation by a driver;

a direction detector configured to detect an actual traveling direction of the vehicle; and a reaction force generation part configured to apply a reaction force to an operation of a steering wheel by the driver; and an electronic control unit having a microprocessor and a memory, wherein the microprocessor is configured to perform:
  determining whether a deviation of the actual traveling direction detected by the direction detector from a target traveling direction of the vehicle in accordance with the driving instruction detected by the operation detector is greater than or equal to a predetermined deviation;
  switching the drive mode to the self-drive mode when it is determined that the deviation is greater than or equal to the predetermined deviation during traveling in the manual drive mode;
  controlling the actuator in accordance with the driving instruction detected by the operation detector in the manual drive mode; and
  controlling the reaction force generation part so as to maintain the reaction force applied immediately before the drive mode is switched to the self-drive mode, when the drive mode is switched from the manual drive mode to the self-drive mode, the controlling including controlling the actuator so as to match the actual traveling direction with the target traveling direction after the drive mode is switched to the self-drive mode, and the switching including switching the drive mode from the self-drive mode to the manual drive mode when the actual traveling direction detected by the direction detector is matched with the target traveling direction after switching the drive mode from the manual drive mode to the self-drive mode.

2. The apparatus according to claim 1, wherein
the microprocessor is configured to perform
when the drive mode is switched from the manual drive mode to the self-drive mode, the controlling including controlling the actuator so as to match the actual traveling direction with the target traveling direction in accordance with the driving instruction detected by the operation detector immediately before the drive mode is switched to the self-drive mode.

3. The apparatus according to claim 1, further comprising
a mode selection portion configured to select the self-drive mode or the manual drive mode in accordance with a selecting operation by the driver, wherein
the microprocessor is configured to perform
the switching including switching the drive mode to the self-drive mode when it is determined that the deviation is greater than or equal to the predetermined deviation on a condition that the manual drive mode is selected by the mode selection portion.

4. The apparatus according to claim 3, wherein
the predetermined deviation is a first deviation, and
the microprocessor is configured to perform
the switching including switching the drive mode to the self-drive mode when it is determined that the deviation is greater than or equal to the first deviation, and thereafter switching the drive mode to the manual drive mode when it is determined that the deviation is less than or equal to a second deviation, the second deviation being less than the first deviation.

5. The apparatus according to claim 1, wherein
the vehicle includes a plurality of wheels,
the plurality of wheels includes a plurality of drive wheels configured to generate driving forces,
the actuator includes a first actuator configured to turn a part of the plurality of wheels and a second actuator configured to change a driving force distribution rate in the plurality of drive wheels, and
the microprocessor is configured to perform
the controlling including controlling the first actuator so as to decrease a turning angle of the part of the plurality of wheels when the drive mode is switched to the self-drive mode in a state that the part of the plurality of wheels is turned, and thereafter controlling the second actuator so as to match the actual traveling direction with the target traveling direction.

6. A vehicle control method configured to control a vehicle having a drive mode switchable between a self-drive mode enabling a self-drive function and a manual drive mode disabling the self-drive function, the vehicle including an actuator for traveling,
the method comprising:
  detecting a driving instruction with respect to the actuator in accordance with an operation by a driver;
  detecting an actual traveling direction of the vehicle;
  determining whether a deviation of the actual traveling direction detected in the detecting of the actual traveling direction from a target traveling direction of the vehicle in accordance with the driving instruction detected in the detecting of the driving instruction is greater than or equal to a predetermined deviation;
  switching the drive mode to the self-drive mode when it is determined that the deviation is greater than or equal to the predetermined deviation during traveling in the manual drive mode;
  controlling the actuator in accordance with the driving instruction detected in the detecting of the driving instruction in the manual drive mode;
  applying a reaction force to an operation of a steering wheel by the driver; and
  maintaining the reaction force applied immediately before the drive mode is switched to the self-drive mode, when the drive mode is switched from the manual drive mode to the self-drive mode, wherein the controlling includes controlling the actuator so as to match the actual traveling direction with the target traveling direction after the drive mode is switched to the self-drive mode, and the switching includes switching the drive mode from the self-drive mode to the manual drive mode when the actual traveling direction is matched with the target traveling direction after switching the drive mode from the manual drive mode to the self-drive mode.

7. The method according to claim 6, wherein
when the drive mode is switched from the manual drive mode to the self-drive mode, the controlling includes controlling the actuator so as to match the actual traveling direction with the target traveling direction in accordance with the driving instruction detected in the detecting immediately before the drive mode is switched to the self-drive mode.

8. The method according to claim 6, further comprising
selecting the self-drive mode or the manual drive mode in accordance with a selecting operation by the driver, wherein
the switching includes switching the drive mode to the self-drive mode when it is determined that the deviation is greater than or equal to the predetermined deviation on a condition that the manual drive mode is selected in the selecting.

9. The method according to claim 8, wherein
the predetermined deviation is a first deviation, and
the switching includes switching the drive mode to the self-drive mode when it is determined that the deviation is greater than or equal to the first deviation, and thereafter switching the drive mode to the manual drive mode when it is determined that the deviation is less than or equal to a second deviation, the second deviation being less than the first deviation.

10. The method according to claim 6, wherein
the vehicle includes a plurality of wheels,
the plurality of wheels includes a plurality of drive wheels configured to generate driving forces,
the actuator includes a first actuator configured to turn a part of the plurality of wheels and a second actuator configured to change a driving force distribution rate in the plurality of drive wheels, and
the controlling includes controlling the first actuator so as to decrease a turning angle of the part of the plurality of wheels when the drive mode is switched to the self-drive mode in a state that the part of the plurality of wheels is turned, and thereafter controlling the second actuator so as to match the actual traveling direction with the target traveling direction.

11. A vehicle control apparatus configured to control a vehicle having a drive mode switchable between a self-drive mode enabling a self-drive function and a manual drive mode disabling the self-drive function, the vehicle including an actuator for traveling,
the apparatus comprising:
an operation detector configured to detect a driving instruction with respect to the actuator in accordance with an operation by a driver;
a direction detector configured to detect an actual traveling direction of the vehicle;
a mode selection portion configured to select the self-drive mode or the manual drive mode in accordance with a selecting operation by the driver; and
an electronic control unit having a microprocessor and a memory, wherein
the microprocessor is configured to perform:
determining whether a deviation of the actual traveling direction detected by the direction detector from a target traveling direction of the vehicle in accordance with the driving instruction detected by the operation detector is greater than or equal to a predetermined deviation;
switching the drive mode to the self-drive mode when it is determined that the deviation is greater than or equal to the predetermined deviation during traveling in the manual drive mode; and
controlling the actuator in accordance with the driving instruction detected by the operation detector in the manual drive mode,
the controlling including controlling the actuator so as to match the actual traveling direction with the target traveling direction after the drive mode is switched to the self-drive mode, and
the switching including switching the drive mode to the self-drive mode when it is determined that the deviation is greater than or equal to the predetermined deviation on a condition that the manual drive mode is selected by the mode selection portion, and switching the drive mode from the self-drive mode to the manual drive mode when the actual traveling direction detected by the direction detector is matched with the target traveling direction after switching the drive mode from the manual drive mode to the self-drive mode,
the predetermined deviation is a first deviation, and
the microprocessor is further configured to perform
the switching including switching the drive mode to the self-drive mode when it is determined that the deviation is greater than or equal to the first deviation, and thereafter switching the drive mode to the manual drive mode when it is determined that the deviation is less than or equal to a second deviation, the second deviation being less than the first deviation.

12. The apparatus according to claim 11, wherein
the microprocessor is configured to perform
when the drive mode is switched from the manual drive mode to the self-drive mode, the controlling including controlling the actuator so as to match the actual traveling direction with the target traveling direction in accordance with the driving instruction detected by the operation detector immediately before the drive mode is switched to the self-drive mode.

13. The apparatus according to claim 11, wherein
the vehicle includes a plurality of wheels,
the plurality of wheels includes a plurality of drive wheels configured to generate driving forces,
the actuator includes a first actuator configured to turn a part of the plurality of wheels and a second actuator configured to change a driving force distribution rate in the plurality of drive wheels, and
the microprocessor is configured to perform
the controlling including controlling the first actuator so as to decrease a turning angle of the part of the plurality of wheels when the drive mode is switched to the self-drive mode in a state that the part of the plurality of wheels is turned, and thereafter controlling the second actuator so as to match the actual traveling direction with the target traveling direction.

14. A vehicle control method configured to control a vehicle having a drive mode switchable between a self-drive mode enabling a self-drive function and a manual drive mode disabling the self-drive function, the vehicle including an actuator for traveling,
the method comprising:
detecting a driving instruction with respect to the actuator in accordance with an operation by a driver;
detecting an actual traveling direction of the vehicle;
selecting the self-drive mode or the manual drive mode in accordance with a selecting operation by the driver;
determining whether a deviation of the actual traveling direction detected in the detecting of the actual traveling direction from a target traveling direction of the vehicle in accordance with the driving instruction detected in the detecting of the driving instruction is greater than or equal to a predetermined deviation;
switching the drive mode to the self-drive mode when it is determined that the deviation is greater than or equal to the predetermined deviation during traveling in the manual drive mode; and
controlling the actuator in accordance with the driving instruction detected in the detecting of the driving instruction in the manual drive mode, wherein
the controlling includes controlling the actuator so as to match the actual traveling direction with the target traveling direction after the drive mode is switched to the self-drive mode, the switching includes switching the drive mode to the self-drive mode when it is determined that the deviation is greater than or equal to the predetermined deviation on a condition that the manual drive mode is selected in the selecting, and switching the drive mode from the self-drive mode to the manual drive mode when the actual traveling direction is matched with the target traveling direction after switching the drive mode from the manual drive mode to the self-drive mode, the predetermined deviation is a first deviation, and the switching further includes switching the drive mode to the self-drive mode when it is determined that the deviation is greater than or equal to the first deviation, and thereafter switching the drive mode to the manual drive mode when it is determined that the deviation is less than or equal to a second deviation, the second deviation being less than the first deviation.

15. The method according to claim 14, wherein when the drive mode is switched from the manual drive mode to the self-drive mode, the controlling includes controlling the actuator so as to match the actual traveling direction with the target traveling direction in accordance with the driving instruction detected in the detecting immediately before the drive mode is switched to the self-drive mode.

16. The method according to claim 14, wherein the vehicle includes a plurality of wheels, the plurality of wheels includes a plurality of drive wheels configured to generate driving forces, the actuator includes a first actuator configured to turn a part of the plurality of wheels and a second actuator configured to change a driving force distribution rate in the plurality of drive wheels, and the controlling includes controlling the first actuator so as to decrease a turning angle of the part of the plurality of wheels when the drive mode is switched to the self-drive mode in a state that the part of the plurality of wheels is turned, and thereafter controlling the second actuator so as to match the actual traveling direction with the target traveling direction.

* * * * *